Dec. 24, 1929.  W. G. KOUPAL ET AL  1,741,026
APPARATUS FOR HANDLING GLASS SHEETS
Filed Nov. 30, 1926   4 Sheets-Sheet 1

INVENTORS
W. G. Koupal
and
J. H. Ridshaw
by J. C. Bradley
atty

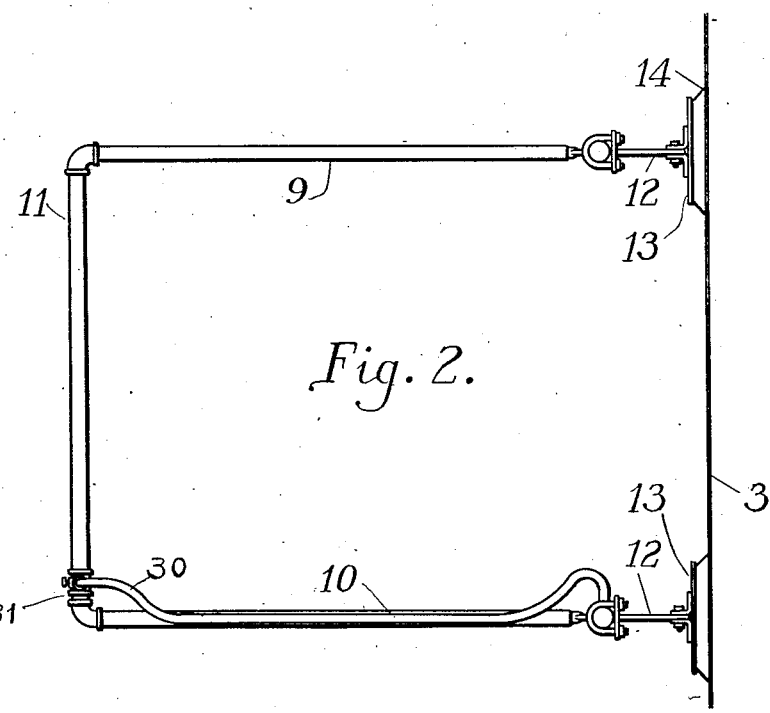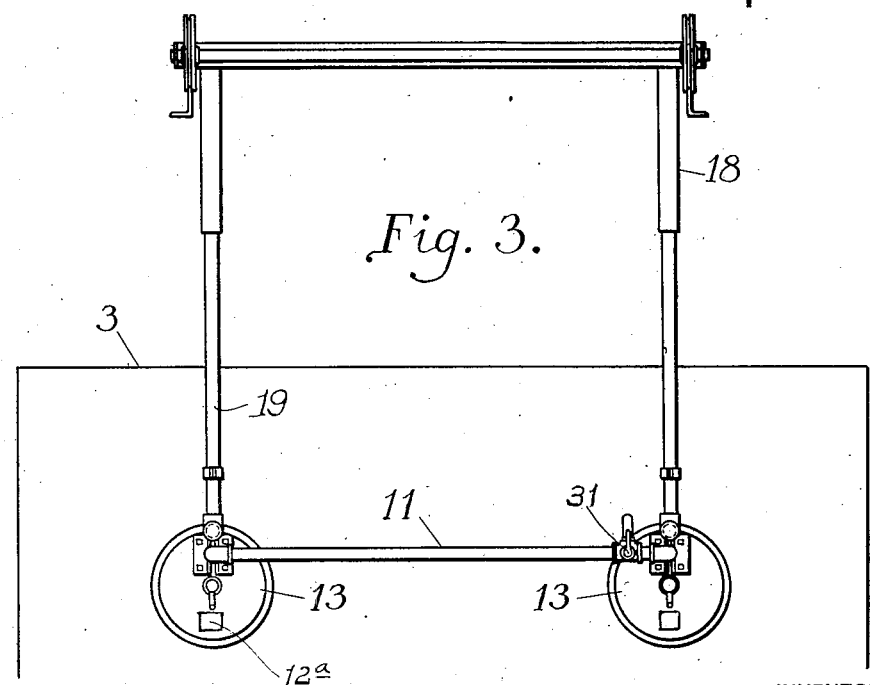

Dec. 24, 1929.  W. G. KOUPAL ET AL  1,741,026
APPARATUS FOR HANDLING GLASS SHEETS
Filed Nov. 30, 1926  4 Sheets-Sheet 4
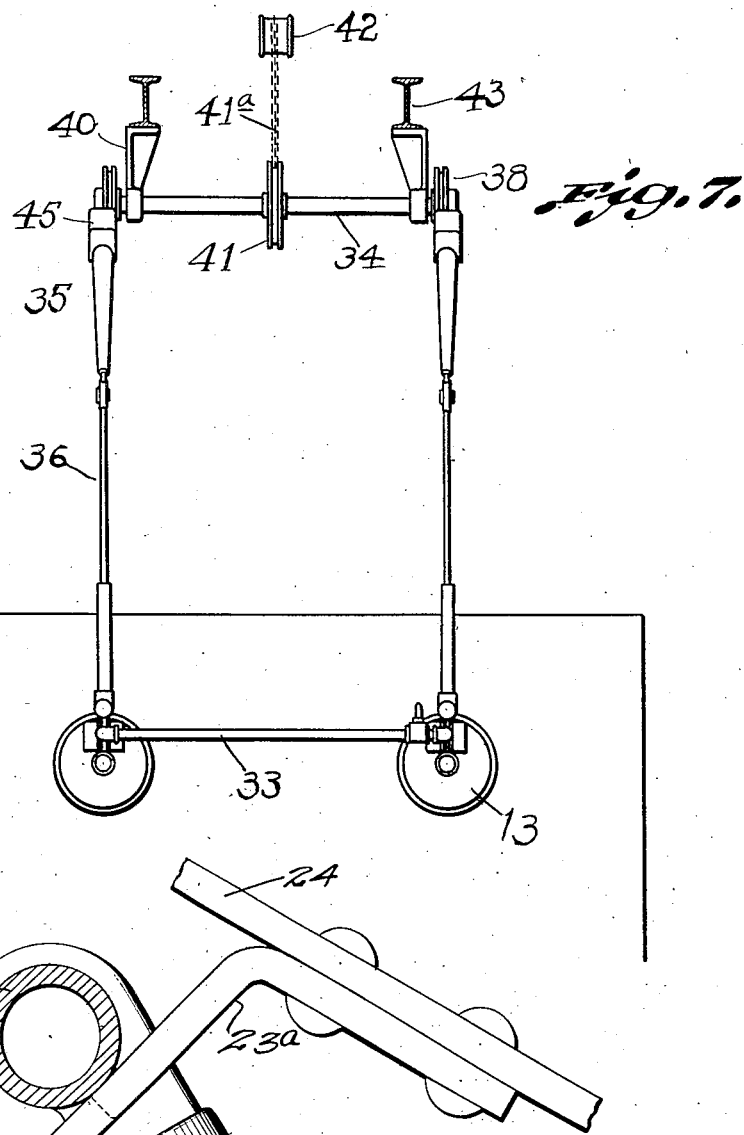
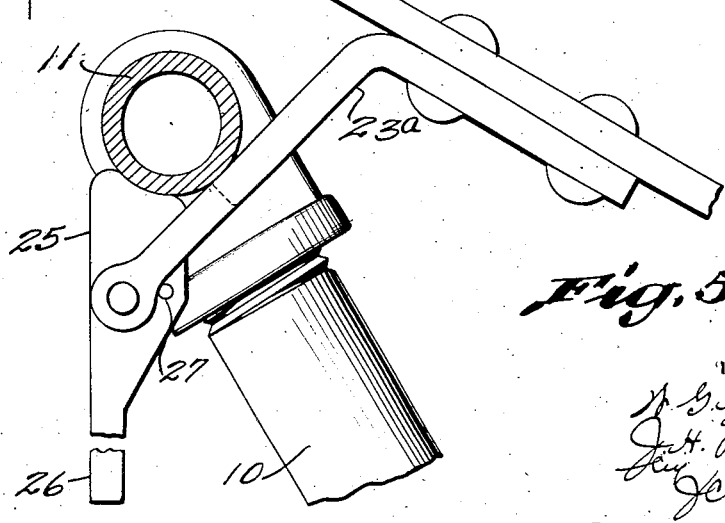

Patented Dec. 24, 1929

1,741,026

UNITED STATES PATENT OFFICE

WALTER G. KOUPAL, OF TARENTUM, AND JOSEPH H. REDSHAW, OF HOMESTEAD, PENNSYLVANIA, ASSIGNORS TO PITTSBURGH PLATE GLASS COMPANY, A CORPORATION OF PENNSYLVANIA

APPARATUS FOR HANDLING GLASS SHEETS

Application filed November 30, 1926. Serial No. 151,709.

Figure 1:
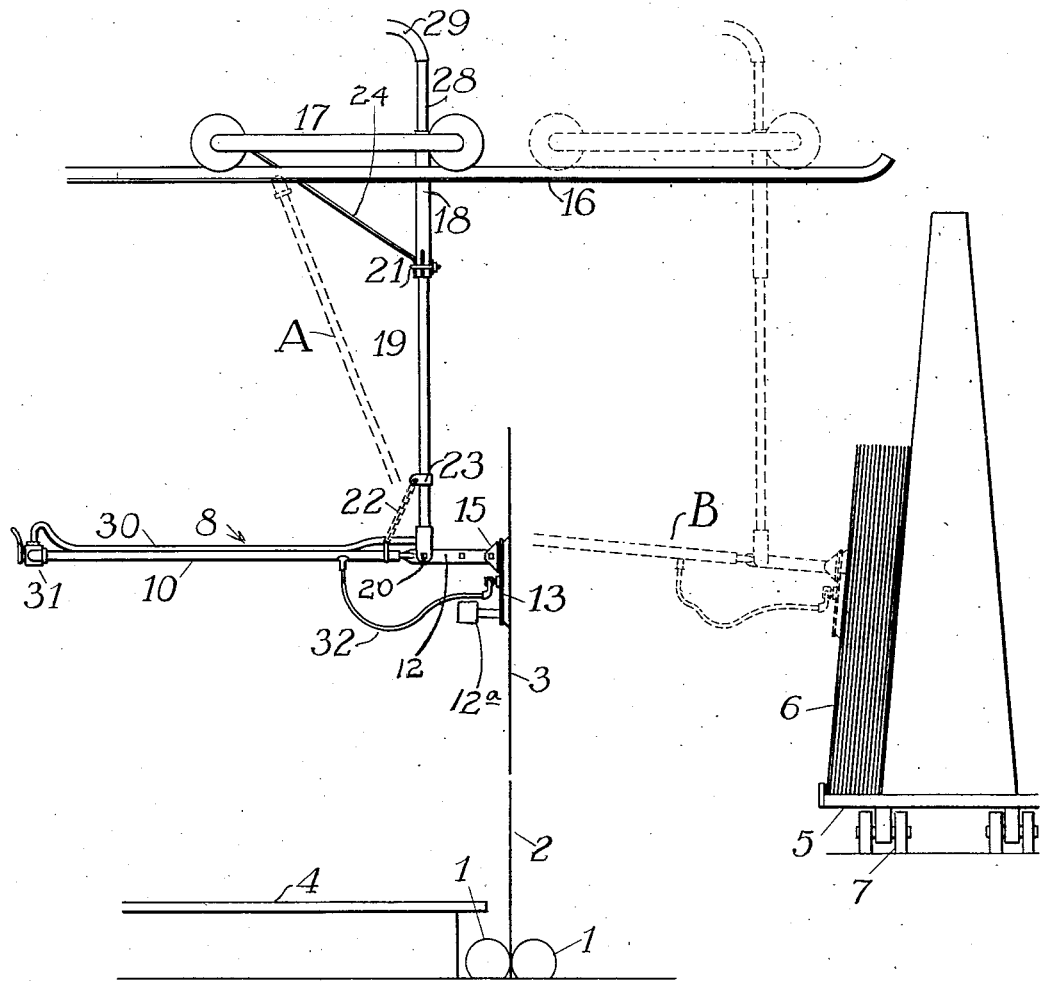
Figure 4:
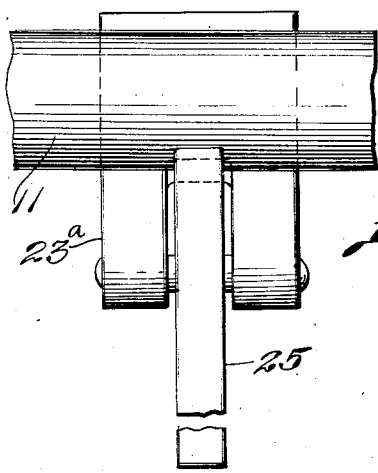
Figure 6:
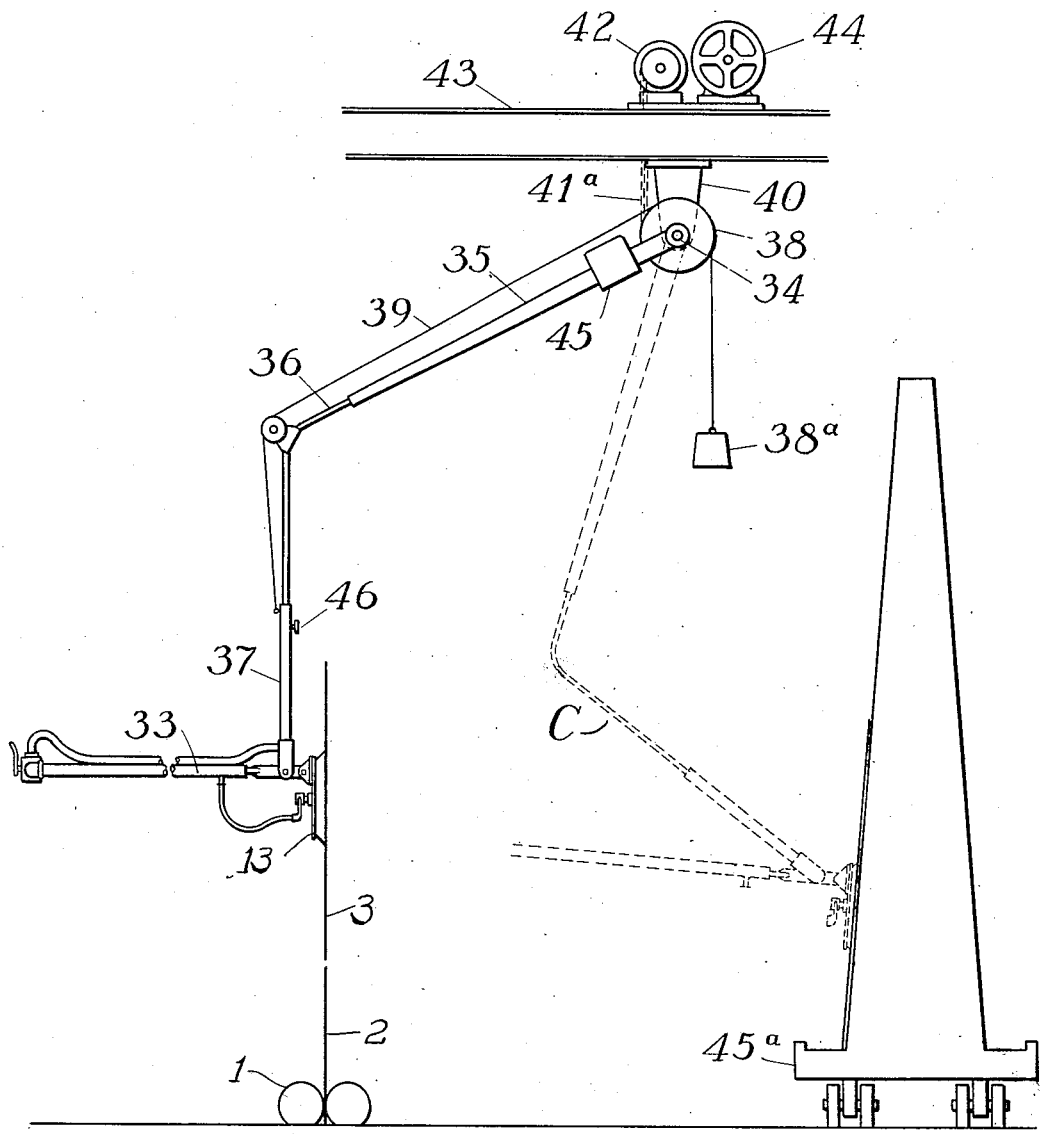

The invention relates to apparatus for handling glass sheets as produced in a continuous vertical drawing operation, such as that shown and described in the Koupal Patent No. 1,598,730 of September 7, 1926, wherein the glass is drawn upward through a leer between opposing pairs of rollers, above the upper end of which leer, the glass is cut into lengths. The sheets as thus cut are carried by the operator to a suitable rack, where they are stacked at a slight angle to the vertical. The racks are provided with wheels for moving them easily, or are lifted and moved by means of an overhead crane. The object of the present invention is to reduce the labor of supporting the sheets by hand as they are cut off and of moving them over to the rack and to make the transfer safer for the operator. The sheets sometimes break in the hands of the operator, and the labor of handling large sheets is very considerable and is rendered more difficult by the heat of the glass. The present invention relieves the operator of the heavy and somewhat hazardous part of the work. Briefly stated, this is accomplished by the use of a vacuum frame provided with suction means for engaging the glass before it is cut off, and supported from above for lateral movement, so that after the sheet is engaged by the vacuum cups and cut off, it may be easily moved forward so as to deposit the sheet upon the rack located forward of the machine. Certain embodiments of the invention are illustrated in the accompanying drawings, wherein:

Figure 1 is a side elevation of the apparatus. Fig. 2 is a plan view. Fig. 3 is a rear elevation. Figs. 4 and 5 are enlarged details showing the latching arrangement for holding the vacuum frame in the inclined position indicated in dotted lines on Fig. 1. Fig. 6 is a side elevation of the modification. And Fig. 7 is a rear elevation of the modification.

Referring to Figs. 1, 2 and 3, 1, 1 are the upper rolls of a drawing machine, such as that shown in the Koupal patent heretofore referred to, 2 being the upper end of a continuously formed ribbon, and 3 being a sheet of glass which has just been severed from the ribbon. 4 is a platform on which the operator stands and 5 is a rack upon which the stack of sheets 6 is placed, such rack being shown, in the present instance, as provided with the wheels 7 for transporting the sheets to the cutting room.

The glass sheets are supported during the severing operation and moved over to the rack by means of the vacuum frame 8. The frame comprises the side members 9, 10 and the rear member 11, which serves as a handle, all of such members consisting of pipes. The side members 9 and 10 carry the bars 12, 12 at their forward ends and to these bars are pivoted the vacuum cups 13, 13 provided with the usual rubber lips 14, 14 for engaging the sheet. The bars 12, 12 have pivotal connections with the vacuum cups, as indicated at 15, 15, so that the cups may adjust themselves to the glass. Extending transversely of the drawing machine and the rack 5 is the track 16 upon which is mounted the trolley 17 for supporting the vacuum frame for movement back and forth from the position of cut off to a position at which the frame deposits the sheet upon the rack, such latter position being indicated by the dotted lines in Fig. 1. The trolley is provided with a pair of depending pipes 18, 18 in which telescope the pipes 19, 19, pivotally connected at their lower ends to the bars 12, 12, as indicated at 20. The lower ends of the pipes 18 are split and are provided with the clamping members 21 for securing the two pipes against relative vertical movement. Provision is made in this way for a vertical adjustment of the position of the vacuum frame. In order to prevent the vacuum frame from tilting downward below a substantially horizontal position, the chains 22, 22 are employed, secured at their upper ends to the collars 23, 23 and at their lower ends to the pipes 9 and 10.

In order to get the vacuum frame out of the way when not in use and when it becomes necessary for the operator to approach close to the line of cut off, means are provided for releasably locking the frame in the upright position A, indicated in dotted lines in Fig. 1. This may be accomplished in various ways, but is preferably done by the use of the means shown in Figs. 4 and 5, including the bracket 23ª riveted to the inclined bar 24 which constitutes a part of the framework of the trolley. This bracket is split, as indicated in Fig. 4, and carries the latch 25 normally assuming a vertical position by reason of the weight of the handle 26. When the bar 11 is swung up to the position indicated in Fig. 5, it rides over the latch 25 reaching the position shown, at which time the latch automatically moves into holding position. A stop pin 27 is provided upon the latch for preventing its upper end from swinging to the left under the weight of the vacuum frame. When it is desired to release the vacuum frame and move it back to horizontal position, this is accomplished by swinging the handle 26 to the left.

A suction pipe 28 is connected to the upper end of one of the pipes 18, and to the upper end of this pipe 28 a flexible hose 29 is secured leading to the source of exhaust. Another pipe 30 is connected at its forward end to the pipe 19 and leads at its rear end into the three-way valve 31. This three-way valve is in convenient position for actuation by the operator who controls the application of vacuum to the pipe framework of the vacuum frame consisting of the members 9, 10 and 11. The exhaust thus applied to the hollow frame is conducted to the vacuum cups by means of the flexible pipes 32. Counterweights 12ª are provided on the vacuum discs to hold them in vertical position and facilitate contact with the sheet.

In operation, the workman stands to the rear of the handle 11 and just before the sheet 3 is cut off moves the frame forward so that the cups engage the sheet, at the same time opening the valve 31 so that the sheet is secured to the cups. The glass is then severed leaving the sheet suspended, as indicated in Fig. 1, the weight of the frame to the rear of the pivots 20 serving to counterbalance the weight of the glass sheet. The operator then pushes the frame forward until the trolley 17 and the vacuum frame reach the position shown in dotted lines and marked B on Fig. 1. This brings the sheet onto the rack 5, the operator at such time tilting the frame slightly upward, as shown, and at this time, the valve 31 is again operated to release the air pressure in the vacuum frame so that the cups may be detached from the glass. The frame is then moved back to its original position to the rear of the line of cut and the apparatus is ready for the next handling operation, the frame being maintained at this time in substantially horizontal position by means of the chains 22, 22.

Figs. 6 and 7 illustrate a modification in which the vacuum frame 33 is supported for swinging movement about the shaft 34 instead of being mounted upon a trolley as in the construction of Fig. 1. The frame in this construction is similar to that of Fig. 1, the difference in the two sets of apparatus consisting in the method of supporting the frame. Secured to the shaft 34 are a pair of hollow arms 35, in which the upper ends of the bars 36 are clamped. The lower ends of the arms 36 telescope into pipe members 37 pivoted to the vacuum frame 33. Each of the arms 35 is provided with a hub keyed to the shaft 34 and mounted for rotation upon this shaft are the pulleys 38. Flexible members 39 passing over the pulleys and are connected at one end to the upper ends of the pipes 37 and at their other ends to the weights 38. In this manner, the weight of the vacuum frame is counterweighted so that it will maintain itself in any vertical position in which it is placed. The shaft 34 is mounted in a pair of suitable hangers 40 and has keyed to its central portion the pulley 41. This pulley is rotated by means of a chain 41ª secured at one end to the periphery of the pulley and having its other end wound around the pulley 42 seated on the framework 43 above the apparatus. The pulley 42 is rotated from the motor 44 through the intermediary of suitable worm gearing. Counterweights 45 mounted upon the arms 35 assist in swinging the vacuum frame from the position shown in full lines to the position shown in dotted lines and marked C in Fig. 6.

The arms 35 with the vacuum frame carried thereby is normally maintained in the position shown in full lines by means of the chain 41ª. When it is desired to carry a sheet of glass from the position of cut off and deposit it upon the rack 45ª, the motor 44 is operated to cause the rotation of the pulley 42 in a counter clockwise direction, thus permitting the chains 41 to move down so that the weight of the apparatus, including the counterweights 45 swings the sheet from the position of cut off to a position over the rack, this movement being, of course, controlled by the operator, who grasps the transverse bar at the left hand end of the vacuum frame 33, as in the other construction. The apparatus is moved back to starting position by causing the rotation of the motor and pulley 42 in the reverse direction, thus swinging the parts to the left. If desired, the counterweight arrangement, including the parts 38 and 39 may be omitted and the pipes 37 secured to the lower ends of the bars 35 by means of suitable set screws 46, so that telescopic arrangement in this case merely provides for the vertical adjustment of the vacuum frame with respect to the supporting means thereabove.

What we claim is:

1. Apparatus for handling glass sheets comprising a movable supporting means, a laterally extending vacuum frame pivotally supported thereon, a suction cup pivoted to the end of said frame for engaging the face of a vertical glass sheet, and counterweight means for holding the face of the cup in substantially vertical position.

2. Apparatus for handling glass sheets comprising a movable supporting means, a laterally extending vacuum frame pivotally supported thereon, a suction cup pivoted to the end of said frame for engaging the face of a vertical glass sheet, and means for holding the cup yieldingly with its face in substantially a vertical plane.

In testimony whereof, we have hereunto subscribed our names.

WALTER G. KOUPAL.
JOSEPH H. REDSHAW.